US010956969B2

(12) United States Patent
Wright et al.

(10) Patent No.: US 10,956,969 B2
(45) Date of Patent: *Mar. 23, 2021

(54) MATCHING SYSTEM FOR CAREER AND ACADEMIC COUNSELING

(71) Applicant: Woofound, Inc., Middle River, MD (US)

(72) Inventors: Carson Wright, Baltimore, MD (US); Joshua Spears, Baltimore, MD (US); Daniel Sines, Middle River, MD (US); Colin Murray, Churchville, MD (US); Jason Truluck, Baltimore, MD (US); Noreen Honeycutt, Baltimore, MD (US); Randie V. Ursal, Baltimore, MD (US)

(73) Assignee: Woofound, Inc., Middle River, MD (US)

( * ) Notice: Subject to any disclaimer, the term of this patent is extended or adjusted under 35 U.S.C. 154(b) by 788 days.

This patent is subject to a terminal disclaimer.

(21) Appl. No.: 13/688,942

(22) Filed: Nov. 29, 2012

(65) Prior Publication Data

US 2013/0108997 A1    May 2, 2013

Related U.S. Application Data

(63) Continuation-in-part of application No. 13/478,817, filed on May 23, 2012, now Pat. No. 8,788,307.

(Continued)

(51) Int. Cl.
*G06Q 30/02* (2012.01)
*G06Q 30/08* (2012.01)

(52) U.S. Cl.
CPC ......... *G06Q 30/08* (2013.01); *G06Q 30/0203* (2013.01)

(58) Field of Classification Search
CPC ...... G06Q 30/236; G06Q 10/06; G06Q 10/10; G06Q 10/063; G06Q 10/063112; G06Q 30/02

See application file for complete search history.

(56) References Cited

U.S. PATENT DOCUMENTS 6,655,963 B1 * 12/2003 Horvitz et al. ............... 434/236
7,165,012 B2     1/2007 Swanson
(Continued)

FOREIGN PATENT DOCUMENTS

KR         2020023675 A  *  3/2020  ..... G06Q 10/063112

OTHER PUBLICATIONS

Mitja et al. Facebook profiles reflect actual personality, not self-idealization. Accessed at https://www.semanticscholar.org/paper/Facebook-profiles-reflect-actual-personality%2C-not-Back-Stopfer/bbcc25ff101b263aab2e46dc2175b2ddae36cb76. Accessed on Mar. 21, 2019 (Year: 2010).*

(Continued)

*Primary Examiner* — Patricia H Munson
*Assistant Examiner* — Nancy N Prasad
(74) *Attorney, Agent, or Firm* — Larry J. Guffey, Esq.; Oliver & Grimsley, LLC

(57) ABSTRACT

An improved system for optimally matching an individual seeking something and one of a plurality of suppliers includes: (a) a plurality of personality traits that are predictive of how one that possesses a combination of these traits is likely to make a selection decision when selecting from among the suppliers, (b) a plurality of images for consideration by the individual, each of the images configured such that an individual who would chose to be associated with the image can from a psychological perspective be assessed to possess one or more of these traits, (c) a first algorithm for ascribing traits to each of the images according to whether (Continued)

Assigned Traits: Competitive, Confident, Dominant, Aggressive, High Energy
Preference: Working in Business one who possess a specific trait would be predicted to associate oneself with a considered image, and (d) a viewer for presenting to the individual each of the images and allowing the individual to identify with which of the images the individual elects to be associated.

34 Claims, 20 Drawing Sheets

Related U.S. Application Data

(60) Provisional application No. 61/530,926, filed on Sep. 2, 2011.

(56) References Cited

U.S. PATENT DOCUMENTS

| | | | |
|---|---|---|---|
| 7,342,583 B2* | 3/2008 | Behar et al. | 345/440 |
| 7,454,357 B2* | 11/2008 | Buckwalter et al. | 705/346 |
| 7,536,273 B2 | 5/2009 | Swanson | |
| 7,552,060 B2* | 6/2009 | Vest | 705/1.1 |
| 7,831,928 B1 | 11/2010 | Rose et al. | |
| 8,027,806 B2 | 9/2011 | Swanson | |
| 8,195,668 B2* | 6/2012 | Drennan et al. | 707/748 |
| 8,341,101 B1* | 12/2012 | Treiser | 706/45 |
| 8,473,490 B2* | 6/2013 | Bonilla et al. | 707/732 |
| 2003/0204437 A1* | 10/2003 | Flender et al. | 705/10 |
| 2004/0162821 A1* | 8/2004 | Buckwalter | G06Q 30/02 |
| 2004/0210661 A1* | 10/2004 | Thompson | G06Q 30/02 709/228 |
| 2004/0260781 A1* | 12/2004 | Shostack et al. | 709/207 |
| 2005/0209909 A1* | 9/2005 | Dull et al. | 705/10 |
| 2006/0041480 A1* | 2/2006 | Briggs | 705/14 |
| 2006/0149614 A1* | 7/2006 | Suzuki et al. | 705/10 |
| 2006/0282306 A1* | 12/2006 | Thissen-Roe | 705/11 |
| 2007/0012325 A1* | 1/2007 | Greenwald | 128/898 |
| 2007/0053513 A1* | 3/2007 | Hoffberg | 380/201 |
| 2007/0073549 A1 | 3/2007 | Terrill et al. | |
| 2007/0078869 A1* | 4/2007 | Carr et al. | 707/100 |
| 2007/0192106 A1* | 8/2007 | Zilca | 704/270 |
| 2007/0282621 A1* | 12/2007 | Altman et al. | 705/1 |
| 2008/0126426 A1* | 5/2008 | Manas et al. | 707/104.1 |
| 2008/0263446 A1* | 10/2008 | Altberg et al. | 715/706 |
| 2010/0077032 A1* | 3/2010 | Drennan et al. | 709/206 |
| 2010/0145869 A1* | 6/2010 | Brown | 705/319 |
| 2011/0029566 A1* | 2/2011 | Grandison et al. | 707/783 |
| 2012/0066618 A1 | 3/2012 | Barker et al. | |
| 2012/0197733 A1 | 8/2012 | Skomoroch et al. | |
| 2012/0197863 A1 | 8/2012 | Skomoroch et al. | |
| 2012/0197881 A1 | 8/2012 | Blue et al. | |
| 2012/0197993 A1 | 8/2012 | Skomoroch et al. | |
| 2012/0226623 A1 | 9/2012 | Jurney et al. | |
| 2012/0290978 A1* | 11/2012 | Devecka | G06Q 30/0277 715/810 |

OTHER PUBLICATIONS

Fitzgerald et al. Is Your Profile Picture Worth 1000 Words? Accessed at https://www.semanticscholar.org/paper/Is-Your-Profile-Picture-Worth-1000-Words-Photo-with-Steele-Evans/6ed3db7ddfe2f6ace9775fb7d5d6621cd2c5eb53. Accessed on Mar. 21, 2019 (Year: 2009).*

Deaconu, M. (2010). Social Networks and Multimedia Content Analysis. Economics, Management and Financial Markets, 5(4), 208-213. Retrieved from https://search.proquest.com/docview/857667311?accountid=14753 (Year: 2010).*

* cited by examiner

| competitive | non-competitive |
| --- | --- |
| needs instant gratification | can delay gratification |
| attention-seeking | private |
| introverted | extroverted |
| aggressive | passive |
| attached | detached |
| independent | dependent |
| erratic | steady |
| focused | distractible |
| intuitive | rational |
| optimistic | pessimistic |
| compassionate | Unfeeling |

(a)

(b)

(c)

Personality Trait Assigned:

Competitive

Physically Driven

FIG. 9(a)

| MODULE DEFINED CAREER PERSONALITIES OR PERSONALITY CATEGORIES |
|---|
| "Naturalists"...are tactile. They use manual and physical skills, frequently working with plants, animals, and the natural environment, to complete tasks. Often nature lovers, they like to experience the world outdoors. They are orderly, functional, efficient, constructive and solid. They excel at working as one with the natural environment. |
| "Action-Takers"...are hands-on-do-ers. They use manual and physical skills, working with technology or machinery to complete tasks. Often there is an athletic aspect to their work. They are handy, practical, systematic, applied, and "down-to-earth." They are drawn to jobs that involve a specific skill-set and a concrete task. They excel at solitary, goal-oriented work and "getting the job done." |
| "Planners"...are the detail people. They are methodical, precise, and detail-oriented. Planners create systems to follow, and enjoy working with data, detail, words and numbers. Great at manipulating data, they love procedure and routine. Often found in office settings, they excel at completing detailed work in an organized manner. |
| "Visionaries"...are pioneers. They are great convincers and like to work with others in a "take charge" capacity. They love to take risks, make changes and set trends. They tend to be ambitious and energetic. Visionaries are often in positions of prominence in business and the public eye and excel at taking charge and gaining the confidence of others. |
| "Mentors"...are people-oriented. They have great communication skills and are most fulfilled when assisting or working directly with others to improve a personal or societal situation. Mentors are patient and compassionate and work best in a group or on a team toward a common goal. Helpers excel at working with others to help them learn and grow. |
| "Inventors"...are creative. They take a contemporary, "out of the box" approach to work and life. Inventors use themselves and other medium, often various forms of the arts, to communicate and interact with the world. Inventors excel when they are "lost in their work," completely engrossed in a project. |
| "Analyzers"...are inquisitive. They delve, study and look deeply for information. They have a keen eye and an experimental nature. Analyzers use these capacities to figure out problems and search for the facts, often in a laboratory environment. They excel at going beyond the surface toward uncovering information and discovery. |

Assigned Traits: Compulsive, Particular, Detail-oriented, Meticulous, Decisive

Preference: Precision

Assigned Traits: Competitive, Confident, Dominant, Aggressive, High Energy

Preference: Working In Business

Assigned Traits: Attuned, Mindful, Empathic, Compassionate, Open-Minded

Preference: Helping Fields

Assigned Traits: Analytical, Rational, Cognitive, Deliberate, Focused

Preference: Analytical Work

FIG. 14

| EXAMPLES OF PERSONALITY TRAITS ASSOCIATED WITH THE MODULE'S CAREER PERSONALITIES | | | | | | |
|---|---|---|---|---|---|---|
| Naturalist | Action-Taker | Analyst | Visionary | Inventor | Mentor | Planner |
| earthy protective relaxed independent | goal-oriented practical concrete solitary | rational inquisitive focused introverted | competitive extroverted high-energy aggressive | creative imaginative passionate expressive | compassionate open-minded self-aware altruistic | detail-oriented meticulous compulsive particular |

FIG. 15

| SAMPLE CATEGORIZATION OF VOCATIONS ACCORDING TO THE CAREER PERSONALITY CATEGORIES THAT ARE PREDICTED TO FLOURISH IN SUCH CAREER ENVIRONMENTS | | | | | | |
|---|---|---|---|---|---|---|
| Naturalist | Action-Taker | Analyst | Visionary | Inventor | Mentor | Planner |
| Veterinary Technologist Forest Firefighter | Transportation Engineer Manufacturing Engineer | Medicine Biostatistician | Chief Executive Sales Manager | Graphic Designer Cosmetologist | Physicians Assistant Interpretor and Translator | Treasurer Regulatory Affairs Specialist |

FIG. 16

| EXAMPLES OF CAREER MODULE DEFINED PERSONALITY BLENDS |
|---|
| Planners/Visionaries (Visionaries/Planners) - You are a blend of leadership and detail! Not only are you great at working with data, words and numbers, but you also have a "take charge" attitude and aren't afraid to take risks, make changes, and set trends. Others look to you for leadership and can count on you to never overlook anything. Don't be surprised to be the person your workplace "can't live without!" |
| Planners/Mentors (Mentors/Planners) - You are an organized people person! Great at taking care of the details in data, words, and numbers, you are unique in that you also pay attention to details in people. You have great communication skills and prefer to work with others in a team approach. An invaluable member of the team, you make sure nothing is overlooked in the task at hand or on the team. |
| Planners/Inventors (Inventors/Planners) - Details and creativity are the name of the game for you! You are full of innovative ideas and know how to break down the details of a project in order to ensure that no small step is overlooked. You are contemporary with your ideas but traditional in your approach to getting the job done. Your creativity and attention to detail make your projects shine! |
| Planners/Analyzers (Analyzers/Planners) - You are a unique blend of curiosity and attention to detail! You like to delve, study, and look deeply for information, never missing a fact or figure on your quest for knowledge. Often working in a laboratory setting, you search for facts and solve problems, all the while with a focus on procedure and routine. With a keen eye for discovery, nothing gets past you! |
| Planners/Action-Takers (Action-Takers/Planners) - You are a blend of doing and detail! You feel mastery when you are working autonomously on projects that are hands-on and goal-oriented. Computers, tools and machinery are comfortable resources for you, and your precision and attention to detail are often the key to completing a task. You "never miss a beat" in getting the job done! |
| Planners/Naturalists (Naturalists/Planners) - You are a hands-on, detail-oriented, hard worker! You like to use manual and physical skills to complete tasks, often outdoors. You have a keen sense of detail and a penchant for data, words, and numbers. This unique blend allows you to create systems and follow routine, often working in the great outdoors, making you literally a "happy camper!" |
| Visionaries/Mentors (Mentors/Visionaries) - You love to work with people and to lead them! You have great communication skills and feel fulfilled when working directly with others on a team approach to a common goal. Add to that your ambition and energy, and you will often find yourself the leader of the team. A natural at gaining the confidence of others, you are truly a trend-setter! |
| Visionaries/Inventors (Inventors/Visionaries) - You are a blend of trend-setting and creativity. Both a natural leader and a natural innovater, you use various forms of the arts and other medium to communicate and interact with the world. Combined with your fearlessness in taking risks and making changes, you are truly a trend-setter. You have a natural energy that you bring to all you take on! |
| Visionaries/Analyzers (Analyzers/Visionaries) - You are a blend of inquisition and ambition. You like to discover and uncover new information, often of a scientific nature. Combine with this your willingness to take risks and make changes, and you are often the trend-setter in the lab. Always willing to dig deeper and encouraging others to join you on this expedition, you are truly a pioneer! |
| Visionaries/Action-Takers (Action-Takers/Visionaries) - You are a leader who isn't afraid to roll up your sleeves and get your hands dirty! You are most comfortable using manual or physical skills to complete the task at hand. You are goal-oriented, handy and practical. Combine this with your characteristic energy and persuasiveness, and you are a natural team-leader with a down-to-earth approach. |

FIG. 17

| EXAMPLES OF CAREER MODULE DEFINED PERSONALITY BLENDS |
|---|
| Visionaries/Naturalists - You are energetic and hands-on! You prefer to work in the natural environment, often with plants and animals, using manual and physical skills to complete tasks. You are unique in that you are also influential to those around you and others look to you as an example and as a leader. You have an enthusiasm you bring to all you do that draws others to you! |
| Mentors/Inventors - You use creativity to bring people together! You have great communication skills and are happiest when you are working with others toward a common goal. You are creative and aren't afraid to take an "out-of-the-box" approach to work and problem-solving. You are comfortable using a variety of medium to interact with the world, bringing a creative spark to all you do! |
| Mentors/Analyzers - You are a unique blend of independent study and productive teamwork. You are inquisitive and often delve into a problem, looking deeply for information. You aren't afraid to go beyond the surface, whether working on an experiment or working with others. You have great communication skills and often enjoy working on a team towards a common goal. |
| Mentors/Action-Takers - You are a teamwork-oriented hands-on-doer. You are happiest using manual or physical skills to complete tasks. You are excellent at goal-oriented work and getting the job done. What is unique about you is that you also truly enjoying working with others towards a common objective and enjoy work that helps others. You are helpful and handy! |
| Mentors/Naturalists - You are happiest when working with a team of people in the natural environment. You prefer to use manual and physical skills to complete tasks. You use your skills to work not only with plants, animals, and elements of nature, but also to work with people. You have great communication skills and excel in teamwork settings, working with others towards a common goal. |
| Inventors/Analyzers - You are creative and inquisitive! You like to delve, study, and look deeply for information, often using a contemporary, "out of the box" approach. You frequently find yourself "lost in your work," completely engrossed in a project or experiment. Determined to uncover new information, you use your creativity and your analytic skills to make up-to-date discoveries and solve problems. |
| Inventors/Action-Takers - You take a hands-on approach to life and work, in both creative and practical realms. You are very tactile, using manual and physical skills to complete concrete tasks, as well as to create new things. You communicate and interact with the world using your actions and the fruits of your labor. When you are in the "zone," there is no project you can't handle! |
| Inventors/Naturalists - You are tactile and creative. You feel "at one" with the world and often find inspiration from the natural environment. You use your manual and physical skills, as well as yourself and other medium, to communicate and interact with the world. You take a constructive yet "out-of-the-box approach to work, bringing an eclectic energy to all you do. |
| Analyzers/Action-Takers - You are hands on and inquisitive. You bring a natural curiosity to your work, and you aren't afraid to roll up your sleeves and get your hands dirty in your quest for knowledge and understanding. Using manual and physical skills, you are practical, systematic, and goal-oriented. Apply these traits to your next big experiment and you are sure to uncover a great new discovery! |
| Analyzers/Naturalists - You are inquisitive about the natural environment. You like to delve, study, and look deeply for information, often through work with plants, animals, and other aspects of nature. You go beyond the surface to find new information, and aren't afraid to use physical and manual skills to get there. You are nature and science combined! |
| Action-Takers/Naturalists - You are action-oriented and hands-on. You like to work with your hands, with tools, instruments, computers and machinery. You are happiest outside and on your own, in nature and with wildlife. You are physical, active and direct in your work, play, and choices. You know what you want and how to get the job done! |

FIG. 18

| Demographic Characteristics From A Sample Of First Year Graduate Students In A Single Discipline (Average Age = 23.1, total n = 46) | | |
|---|---|---|
| | n | % |
| Gender: <br> Male <br> Female | <br> 13 <br> 33 | <br> 28 <br> 72 |
| Race/Ethnic Group: <br> African-American <br> Caucasian <br> Latino <br> Asian-American <br> Other | <br> 12 <br> 21 <br> 9 <br> 2 <br> 2 | <br> 26 <br> 46 <br> 20 <br> 4 <br> 4 |
| Employment: <br> Full-time <br> Part-time <br> Unemployed | <br> 29 <br> 12 <br> 5 | <br> 63 <br> 26 <br> 11 |

FIG. 19

| Assessment Re-test Results | | |
|---|---|---|
| Top 4 Profiles: | 1$^{st}$ Assessment - % | 2nd Assessment - % |
| Mentor | 89.6 | 86.4 |
| Visionary | 90.1 | 85.3 |
| Planner | 93.1 | 90.3 |
| Inventor | 88.3 | 77.9 |

FIG. 20

| MODULE DEFINED LEARNING STYLES OR CATEGORIES |
| --- |
| Visual - Seeing is believing! You learn best when information is presented to you in pictures, colors, maps, diagrams and images. You have a strong ability to visualize information in your mind and can easily "picture" ideas and concepts. You would gladly replace words with pictures to learn and retain new information. The more colors involved the better! In fact, a collection of colorful pens are useful tools for you to draw and color code your projects. Be sure to let your teachers know that for you, a picture speaks a thousand words. |
| Auditory - You are a great listener! You learn best when you hear information rather than reading it. Music is inspiring to you and you often have a song playing in your head to help you remember and integrate new ideas. You are active in class discussion and a whiz at explaining your point of view to others. Interacting in groups and oral reports are helpful to you in the learning process. Your memory is great when you can hear yourself repeat information aloud. Audio books and recordings are useful tools for you as you study. Be sure to let your teachers know that you are listening. |
| Physical/Hands-On - You are happiest when you are in motion! You learn best when you can get out of your seat, move around and do a hands-on project. You think best when you are exercising and you grasp concepts best when you can touch and get a real feel for things. Lab exercises trump lectures for you any day and when you can move around, you are always bound to remember the material better. You would rather take something apart to figure it out than to read a manual. Athletic and hands-on projects are the best tools for your active style of learning. Be sure to let your teachers know that stretch breaks are the name of the focusing game for you. |
| Rational - You are a deep thinker! You learn by using your mind for logic and reason. Patterns and connections are natural for you as you are introduced to new material. You tend to classify and organize information into categories to help you make sense of things and to remember. You tend to count and sequence the steps as you take in information, often dividing information into segments. You are good with numbers and calculations and always work through problems methodically. Puzzles, mysteries and strategy are helpful tools to keep your mind sharp and interested. Be sure to let your teachers know that you learn best when you are challenged to problem-solve. |
| Interactive - You are a people person! You learn best through your interactions with others whether it be your classmates, your teachers or your friends. Your excellent communication skills makes you the go-to person for others to talk to and share ideas with. New information is best remembered and understood when you are part a group. Sharing ideas through talking and receiving feedback is your greatest learning tool. Be sure to let your teachers know that you are energized to learn through engaging with others. |
| Reflective - You are a deep thinker! You learn best when you can count on your capacity to think things through on your own. Your excellent ability to concentrate and to focus, allows you to analyze new information and to process your feelings and thoughts about it. You prefer to work on your own in a quiet environment as you value your privacy. Self-reflection and keeping a journal are excellent tools for you to evaluate your learning progress. Be sure to let your teachers know that you trust your ability to self-monitor and learn best when you have quiet space for yourself. |
| Verbal - You are a wordsmith! You learn best when lessons include words, whether they are spoken or written. You are an avid reader and retain information due to the richness that words hold for you. Writing is also one of your gifts and you are able to show what you know in essays and papers. Increasing your vocabulary is both a hobby and an excellent learning tool for you. Be sure to let your teachers know that you love to play and experiment with words. |
| Environmental - You are a nature-lover! You learn best when interacting with the natural world. Outdoor classes and working with plants and animals is the gateway for you to take in and remember new information. Your love for the environment is motivating for you and much of what you live, read and write about pertains to it. Anything that puts you in touch with your attachment to nature is your best tool for learning. Be sure to let your teachers know that there is much to be learned outside the walls of the school. |

FIG. 21

| EXAMPLES OF LEARNING STYLE BLENDS |
|---|
| Visual/Auditory - You learn well using both your eyes and your ears. You prefer that information is presented to you either in pictures you can see or a lecture you can hear. You have a strong ability to visualize information in your mind, and you are great at explaining your ideas to others. You may find that listening to music, color coding your work, and repeating concepts out loud are all helpful learning tools for you! |
| Visual/Physical - You learn well using both your eyes and your physical nature. You prefer that information is presented to you either in pictures you can see, or in a hands-on project in which you can participate. You have a strong ability to visualize information in your mind, and you are great at performing experiments and tactile tasks. You may find that studying while exercising, color coding your work, and taking frequent breaks to stretch and move around are all helpful learning tools for you! |
| Visual/Rational - You learn well using both your eyes and your mind. You prefer that information is presented to you either in pictures you can see, or in a methodical way that allows you to classify and organize new material. You have a strong ability to visualize information in your mind, and you are great at organizing information into logical categories in order to enhance understanding. You may find that puzzles, color coding your work, and searching for patterns are all helpful learning tools for you! |
| Visual/Interactive - You learn well using both your eyes and your peers. You prefer that information is presented to you in either pictures you can see, or in a group with whom you can interact. You have a strong ability to visualize information in your mind, and your great communication skills make you an effective team learner. You may find that doing homework with friends, color coding your work, and sharing ideas through talking and receiving feedback are helpful learning tools for you! |
| Visual/Reflective - You learn well using both your eyes and your intuition. You prefer that information is presented to you in pictures you can see and an environment in which you can focus. You have a strong ability to visualize information in your mind, and you excel at concentration. You may find that keeping a journal, color coding your work, and having a private work environment are helpful learning tools for you! |
| Visual/Verbal - You learn well using both your eyes and your words. You prefer that information is presented to you in pictures you can see, or in words, either written or spoken. You have a strong ability to visualize information, and you are an avid reader and writer. You may find that vocabulary building, color coding your work, and taking notes are helpful learning tools for you! |
| Visual/Environmental - You learn well using both your eyes and your environment. You prefer that information is presented to you in pictures you can see, or in the natural world where you can interact with the outdoors. You have a strong ability to visualize information, and you have a knack for working with plants and animals. You may find that doing homework outdoors, color coding your notes, and choosing subjects as they relate to nature are all helpful learning tools for you! |
| Auditory/Physical - You learn well using both your ears and your physical nature. You prefer that information is presented to you in a lecture you can hear or in a hands-on project in which you can participate. You are great at explaining your ideas to others, and at performing experiments and tactile tasks. You may find that studying while exercising, listening to music, and repeating concepts out loud are all helpful learning tools for you! |
| Auditory/Rational - You learn well using your ears and your mind. You prefer that information is presented to you in a lecture you can hear, in a methodical way that allows you to classify and organize new material. You are great at explaining your ideas to others, and at organizing information into logical categories. You may find that listening to music, doing puzzles, and repeating concepts out loud are all helpful learning tools for you! |
| Auditory/Interactive - You learn well using your ears and your peers. You prefer that information is presented to you in a lecture you can hear, or in a group with whom you can interact. You are great at explaining your ideas to others, and your excellent communication skills make you an effective team learner. You may find that listening to music, doing homework with friends, and repeating concepts out loud are all helpful learning tools for you! |
| Auditory/Reflective - You learn well using both your ears and your intuition. You prefer that information is presented to you in a lecture you can hear and an environment in which you can focus. You are great at explaining your ideas to others, and you excel at concentration. You may find that listening to music, having a private work environment, and repeating concepts out loud are all helpful learning tools for you! |
| Auditory/Verbal - You learn well using your ears and your words. You prefer that information is presented to you in words, either written or spoken. You are great at explaining your ideas to others, and you are an avid reader and writer. You may find that listening to music, taking notes, and repeating concepts out loud are all helpful learning tools for you! |

FIG. 22

| EXAMPLES OF LEARNING STYLE BLENDS |
|---|
| Auditory/Environmental - You learn well using your ears and your environment. You prefer that information is presented to you in a lecture you can hear, or in the natural world where you can interact with the outdoors. You are great at explaining your ideas to others, and you have a knack for working with plants and animals. You may find that listening to music, doing homework outdoors, and repeating concepts out loud are all helpful learning tools for you! |
| Physical/Rational - You learn well using your physical nature and your mind. You prefer that information is presented to you in a hands-on project in which you can participate, and in a methodical way that allows you to classify and organize new material. You are great at performing experiments and concrete tasks, and at organizing information into logical categories. You may find that studying while exercising, doing puzzles, and taking frequent breaks to stretch and move around are all helpful learning tools for you! |
| Physical/Interactive - You learn well using your physical nature and your peers. You prefer that information is presented to you in a hands-on project in which you can participate, ideally with a group of people. You are great at performing experiments and concrete tasks, and your communication skills make you an effective team learner. You may find that studying while exercising, doing homework with friends, and taking frequent breaks to stretch and move are effective study tools for you! |
| Physical/Reflective - You learn well using your physical nature and your intuition. You prefer that information is presented to you in a hands-on project in which you can participate, in an environment in which you can focus. You are great at performing experiments and concrete tasks, and you excel at concentration. You may find that studying while exercising, keeping a journal, and taking frequent breaks to stretch and move are helpful learning tools for you! |
| Physical/Verbal - You learn well using your physical nature and your words. You prefer that information is presented to you in a hands-on project in which you can participate, or in words, either written or spoken. You are great at performing experiments and concrete tasks, and you are an avid reader and writer. You may find that studying while exercising, taking notes, and taking frequent breaks to stretch and move are helpful learning tools for you! |
| Physical/Environmental - You learn well using your physical nature and your environment. You prefer that information is presented to you in a hands-on project in which you can participate, ideally in the natural world where you can interact with the outdoors. You are great at performing experiments and concrete tasks, and you have a knack for working with plants and animals. You may find that studying while exercising, doing homework outside, and taking frequent breaks to stretch and move are helpful study tools for you! |
| Rational/Interactive - You learn well using your mind and your peers. You prefer that information is presented to you in a methodical way that allows you to classify and organize new material, ideally in a group with whom you can interact. You are great at organizing information into logical categories, and your excellent communication skills make you an effective team learner. You may find that doing puzzles, doing homework with friends, and searching for patterns are all helpful learning tools for you! |
| Rational/Reflective - You learn well with your mind and your intuition. You prefer that information is presented to you in a methodical way that allows you to classify and organize new material, ideally in an environment in which you can focus. You are great at organizing information into logical categories, and you excel at concentration. You may find that doing puzzles, keeping a journal, and searching for patterns are helpful learning tools for you! |
| Rational/Verbal - You learn well with your mind and your words. You prefer that information is presented to you in a methodical way that allows you to classify and organize new material, using words, either written or spoken. You are great at organizing information into logical categories, and you are an avid reader & writer. You find that doing puzzles, taking notes, and searching for patterns are helpful learning tools! |
| Rational/Environmental - You learn well with your mind and your environment. You prefer that information is presented to you in a methodical way that allows you to classify and organize new material, ideally in the natural world where you can interact with the outdoors. You are great at organizing information into logical categories, and you have a knack for working with plants and animals. You may find that doing puzzles, going outside to do homework, and searching for patterns are helpful learning tools for you! |
| Interactive/Reflective - You learn well with your peers and your intuition. You prefer that information is presented to you in a group with whom you can interact, ideally in an environment in which you can focus. Your excellent communication skills make you an effective team learner, and you excel at concentration. You may find that doing homework with friends, keeping a journal, and sharing ideas through talking and receiving feedback are helpful learning tools for you! |
| Interactive/Verbal - You learn well with your peers and your words. You prefer that information is presented to you in a group with whom you can interact using words, either written or spoken. Your excellent communication skills make you an effective team learner, and you are an avid reader and writer. You find that doing homework with friends, taking notes, and sharing ideas through talking are helpful learning tools! |

FIG. 23

| MODULE DEFINED TEACHING STYLES OR CATEGORIES |
| --- |
| Visual Teacher - As a Visual Teacher, your classroom is decorated in a way that is both artistically-appealing and full of educational facts. You understand that simply changing colors can spark the memory of certain information into your students' minds. You incorporate diagrams, maps and PowerPoint presentations into your lessons on a regular basis. You show rather than tell. |
| Auditory Teacher - As an Auditory Teacher, you make sure that your words are as clear as possible. You use music in your classroom, even if you are teaching a history lesson. You are a storyteller, or you have others come into the classroom to tell their stories. You might record your lessons for students to listen to later. When it comes to learning, your students are all ears! |
| Physical/Hands On Teacher - As a Hands On Teacher, your students are out of their seats! You assign projects that allow students to work with their hands. Your students build with blocks and mold with clay. You understand that not all knowledge is learned at a desk. |
| Rational Teacher - As a Rational Teacher, you challenge your students to solve problems. You spark their knowledge with puzzles and mysteries. Your students research the answers to their questions. You understand that your students work best when given clear steps, so outlining and the scientific method help them towards discovering knowledge. You help your students "figure it out." |
| Interactive Teacher - As an Interactive Teacher, your classroom is rarely quiet. You support group discussions as well as group projects. You encourage your students to voice their opinions, to engage in lively debates and to interview each other. Your students not only learn from you, but they learn from each other. |
| Reflective Teacher - As an Introspective Teacher, you do your best to work one-on-one with each student. You help your students to set goals, and you stick with them to make sure that they accomplish their tasks. You allow them to express their thoughts through journal writing and encourage them to make pro/con lists to solve a problem. In your classroom, there is a quiet space for your students to focus and reflect. With your help, your students can find the knowledge they are looking for "inside." |
| Verbal Teacher - As a Verbal Teacher, you ask your students to demonstrate their knowledge with their words. You encourage your students to write brilliant essays, voice their thoughts to the class through speeches and share their emotions through touching poems. You teach your students to appreciate the written word and have them read everything from novels to newspaper articles. You encourage your students to "use their words." |
| Environmental Teacher - As a Naturalistic Teacher, your lessons take place outside of the school's walls. You often hold class outdoors and take your students on nature hikes. You bring nature into the classroom, too, in the form of plants and classroom pets. You promote recycling and encourage your students to love the earth. Your students know that not all learning is accomplished inside of a classroom. |

MATCHING SYSTEM FOR CAREER AND ACADEMIC COUNSELING

CROSS-REFERENCE TO RELATED APPLICATION

This a Continuation-In-Part Patent Application and claims the benefit of Provisional Patent Application No. 61/530,926, filed Sep. 2, 2011 and Regular patent application Ser. No. 13/478,817, filed May 23, 2012, which issued as U.S. Pat. No. 8,788,307 on Jul. 22, 2014, with both being filed by the present inventors. The teachings of these applications are incorporated herein by reference to the extent that they do not conflict with the teaching herein.

BACKGROUND OF THE INVENTION

1. Field of the Invention

The present invention relates generally to the operation of matching individuals with services and/or products being sought. Specifically, the invention is an improved user interface that relates to a system and method for matching an individual seeking something and one of a plurality of suppliers who each can provide to differing degrees the something being sought. In a preferred embodiment, this matching system is used to advise an individual seeking academic and/or career counseling guidance.

2. Description of the Related Art

Various online consumer matching services often seek to match consumers or individuals with other individuals, desired products, service providers or various types of information, etc. The techniques utilized to create these matches often depend on the development of a database of service or product providers in which a key component of these databases is a ranking of the various service providers or products according to information accumulated by the matching service on the satisfaction levels of some of the prior users of the service providers or products.

Other than typical consumer or individual profile information (e.g., name, address, phone number) and general purchasing requirements (services sought, pricing sensitivities, geographic considerations, general preferences—e.g., "American style", "Italian," "Classical"), little further information is collected by the matching service from the consumer or individual. In addition, the matches typically are one-to-one and match a consumer or individual preference with a direct attribute of the service or product provider.

There is a significant level of consumer feedback on many of these matching services which suggests widespread dissatisfaction with many of their matches. This result is often attributed to the fact that the number of prior users contributing to a provider's ranking is too small and therefore not a representative sample of all of a provider's prior customers or users. Also, "user reviews" and "comments" often are biased, or the particular preference of the reviewer is not made apparent to the consumer or individual. Accordingly, there is a need for improved matching services of all kinds.

SUMMARY OF THE INVENTION

Recognizing the need for the development of an improved system and method for matching an individual seeking something and one of a plurality of suppliers who each can provide to differing degrees the something being sought, the present invention is generally directed to overcoming the problems and disadvantages exhibited by the existing matching services.

According to the present invention, an improved system for optimally matching an individual seeking something and one of a plurality of suppliers includes: (a) a plurality of psychology-based, personality traits that are predictive of how one that possesses a combination of these traits is likely to make a selection decision when selecting from among the suppliers, (b) a plurality of images for consideration by the individual, each of the images configured such that an individual who would chose to be associated with the image can from a psychological perspective be assessed to possess one or more of these traits, (c) a first algorithm for ascribing traits to each of the images according to whether one who possess a specific trait would be predicted, upon considering one of the images, to associate oneself with the considered image, (d) a viewer for presenting to the individual each of the images and allowing the individual to identify with which of the images the individual elects to be associated, and (e) wherein the images are further configured such that the election by the individual of the associations determines the individual's personality profile that can be used in optimally matching the individual with one of the suppliers.

The present invention can be used in many areas. For example, it can take the form of an assessment tool for use by students that measures their vocational proclivities and interests in a novel, fun and meaningful way.

As such a tool, it is implementable on a computer that takes as its input simple user responses or selections according to whether the user chooses "me" or "not me" in response to their individual preferences to a series of images which are shown to the user. Unbeknownst to the user, each image has been tagged/assigned certain ranked personality traits according to the psychological content of the images. These responses to the tagged images are used to formulate for the user a career personality profile. This is then matched against a database of identified career paths or work activities that have been ascribed similar tags/career personalities. The result of this matching is the compiling for a user of a list of ranked career paths or work activities which are recommended for the user's consideration.

Thus, there has been summarized above (rather broadly and understanding that there are other preferred embodiments which have not been summarized above) the present invention in order that the detailed description that follows may be better understood and appreciated.

BRIEF DESCRIPTION OF THE DRAWINGS

FIG. 9(*a*) shows the seven career personality categories defined by the career module of the present invention.

FIG. 14 shows some of the key personality traits that can be used to distinguish between the career module's seven career personality categories.

FIG. 15 illustrates a small sample of a vocational categorization according to the career personality categories defined herein.

FIGS. 16-17 shows examples of the blends of career personalities that can be attained with the career module.

FIGS. 18-19 show results achieved from testing that was undertaken to measure reliability and validity of the guidance provided by the career module.

FIG. 20 shows the eight learning styles or categories defined by the learning styles module of the present invention.

FIGS. 21-22 shows examples of the blends of learning styles that can be assessed with the learning style module.

FIG. 23 shows the eight teaching styles or categories defined by the teaching styles module of the present invention.

DESCRIPTION OF THE PREFERRED EMBODIMENT

Figures 1, 2:
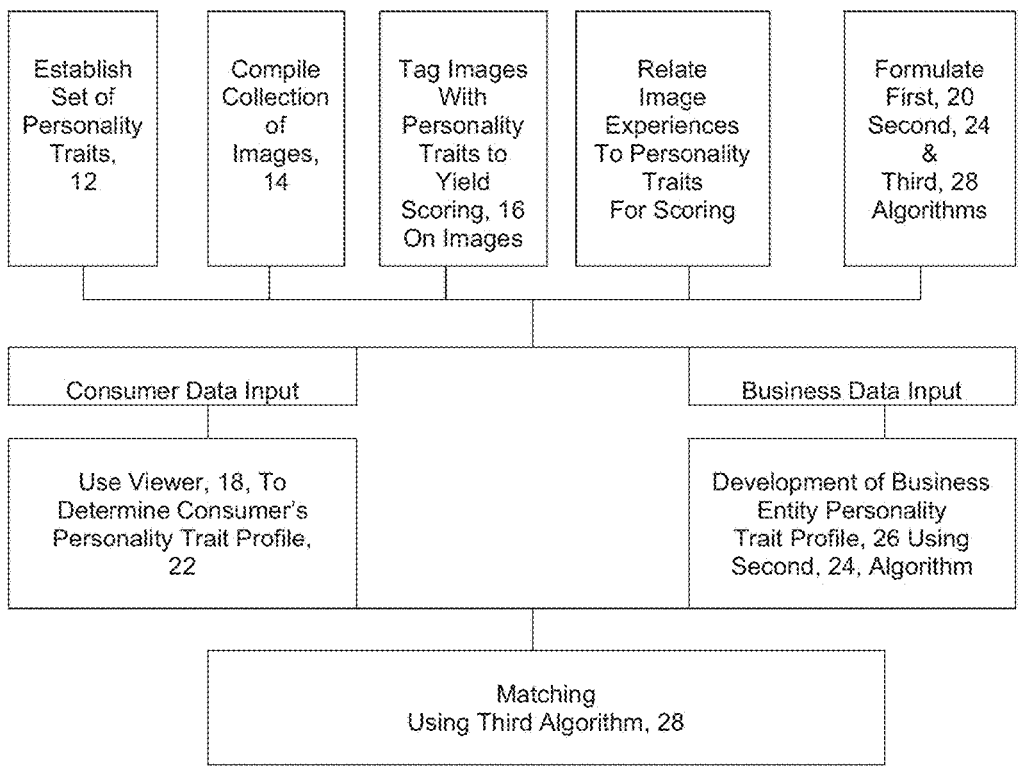
FIG. 1 is a flow diagram representation of a preferred embodiment of the present invention in the form of a method for consumer and business matching.
FIG. 2 provides a representative list of the personality traits identified and used by the present invention.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The present invention generally relates to an improved method or system (10) for matching individuals to those things that they think they want or need (e.g., academic counseling, career advancements, relationships with others, products or services, etc.). Alternatively, the present invention can be considered to be an improved user interface that relates to a system and method for matching an individual seeking something and one of a plurality of suppliers who each can provide to differing degrees the something being sought. Like prior matching services, the present invention requires the development of databases of the profiles of the individuals who are doing the seeking and the things which they are seeking.

However, the present invention differs from prior matching services in that it develops novel psychology-based profiles for the individuals which it seeks to serve. These profiles contain far more than the standard data which is usually collected (e.g., consumer's contact information and information on the nature of the services, events, experiences or products being sought and related preferences (cost, location, style, etc.)). The present invention's consumer or user profiles contain a novel identification of the personality traits (12) and preferences of the consumer, especially those which the present inventors have found to be predictive of whether an individual having any one of the many subsets of these traits is likely to be optimally satisfied with a resulting match.

These personality traits are based on the clinical knowledge that many personality traits are ubiquitous, and exist to varying degrees in each individual. Consequently, sets of dichotomous personality traits have been selected in order to measure the degree to which each user of the present invention possesses distinct traits and preferences.

Additionally, the present inventors have formulated a means or second algorithm (24) by which they can ascribe to those things being sought (e.g., services, events, experiences and products, which are available from the providers or businesses using the present invention) the personality traits which the individuals or consumers who select these things and are subsequently satisfied with them are most likely to possess. Thus, the present invention's identification of a user or seeker's personality traits and the appropriate ascribing of these same traits to the array of things being sought provides a novel means to help perform the desired matching service (e.g., provide one with a list of the things (or their providers which are most likely to be of interest to an individual).

For example, the pairing or matching of consumers and providers/businesses can occur when the present invention's system of artificial and interpretive intelligence analyzes, from a personality trait perspective, the various consumer and the things they're seeking and algorithmically computes the best matches. A unique user interface is used to assess a consumer's personality traits and arrive at a personality trait profile (22) which is then analyzed and matched against the similar product/service/business-providers profiles (26) that are ascribed to the available (i.e., in the present invention's database of available things) services, events, experiences and products to find, using a matching or third algorithm (28), optimal matches.

The present invention's user interface or consumer personality assessment or association tool entails consumer selections of "me (i.e., the consumer associates him/her-self with the image)" or "not me" as he/she views a means for viewing or a carousel (18) of images (14). Unbeknownst to the viewer, these images have ranking or scoring (16) for personality traits associated with each image i.e., personality traits are ascribed to each of the images according to whether one who possess a specific personality trait would be psychologically predicted, upon considering one of the images, to associate himself or herself with the considered image. Utilizing this scoring or means for scoring or use of a first algorithmic process or first algorithm (20) for ascribing personality traits to the images, the sum of a user's associations with the images yields an identification of a unique set, or a full determination, of personality traits which are ascribable to the user. We refer to this derived set of personality traits as a consumer's personality trait profile (22).

The carousel (18) of images (14) of the present invention is a unique application of existing technology to improve the classic matching process. This carousel or slider is unique itself. In a preferred embodiment, it is a user interface by which a series of pre-defined but randomly selected images (14) are displayed such that: (i) the image for consideration is larger than the previous and next image, (ii) the previous and next images have a lower opacity, (iii) a user utilizes an input device, such as a mouse or a finger on a touch screen, to go forward or back in the array of images, and (iv) with each image, the user selects (or deselects) whether such image is representative of that person's likes or dislikes by selecting "me" or "not me."

Each image may also have a written or spoken titles or another communication means (30) (e.g., a recording image of music or other types of sound) affixed to or associated with it which seeks to help to clarify for the consumer the nature of the image and the activity, product, experience, quality, etc. which the viewing or consideration of the image is attempting to determine whether the consumer "will" or "will not" elect to be associated.

This technology creates a new mechanism by which individuals can relate and connect to those things which they are seeking or need. It also allows users to control the identity and relationship that is necessary to achieve a high value experience.

The present invention when implemented as part of a social media network allows its user or consumers to go beyond blogging, sharing photos, postings, social schedules and updates, and to engage and connect with businesses or others whose paths they may not have crossed but for the trait matching services of the present invention. It provides consumers with easy access to an expansive catalog of things to do and places to go and then helps get them there and enjoy the experience.

It focuses individuals or consumers on active engagement, instead of passive observation. It also has the ability to bring together friends and family, work associates, casual acquaintances and even like-minded strangers to engage in rewarding lifestyle activities that may be familiar or heretofore unknown.

The present invention establishes a dynamic new relationship between consumers and businesses. The communications platform on which it is implemented allows people to more effectively organize family, social or business excursions; helps people make better decisions about where to go and what to do; improves time management and reduces the costs associated with an active lifestyle.

Similarly, for product or service providers (including educational institutions), the present invention helps them attract new and repeat users or customers; improves the efficiency, productivity and costs associated with marketing, advertising and promoting a provider's products or services; enhances user or customer service and satisfaction.

By potentially matching individual seekers with the things they are seeking based upon a shared affinity of purpose and interest, the communications platform of the present invention can serve as a lynch pin that connects one's preferences with optimal outcomes, and thereby become integral to facilitating all types of matching services. For example, once consumer profiles and ascription of traits to available services, events, experiences and products are complete, the present invention's matching service creates smart arrangements for consumers to enjoy social, recreational and travel experiences offered by selected businesses.

The present invention can also be considered as a turnkey inquiry system that optimally matches a user's personality traits or profile (22) and preferences with the profile of that which is being sought (26)—e.g., academic counseling, the best provider of a product, service or career opportunity. In the realm of shopping, it can be an effective mobile concierge that matches inquiries with places to visit and things to do; it can be a business and personality profile template that stores comprehensive information for the personal use and management of a consumer. It can also be a lifestyle management system that organizes, informs and directs the user to specific destinations. It is configurable in such a way that it is available both as a mobile application on any smart phone and as an online web application.

In a preferred embodiment, the present invention is a method that is implementable on a computer that takes as its input simple consumer "me"/"not me" selections in response to a series of images (14) that are in a carousel or image viewer (18) where one main image is displayed at a time and the consumer makes a selection according to whether the consumer identifies their preference and likelihood to typically participate in or be associated with the activity, service, product, trait, quality, etc. represented in the image under consideration. Each image being evaluated has been previously tagged/assigned certain ranked personality traits according to the matching service's or present invention's perception of the psychological content of the images.

These responses to the tagged images are stored and used to formulate the consumer's personality trait profile (22). These are then matched against a database of different versions of the thing being sought, each of which has been ascribed similar tags/personality traits or profiles (26) and that are available from those businesses (e.g., providers of a wide range of services, events and experiential activities) which have registered with the database of the present invention.

The result of this matching is the compiling for the consumer of a list of ranked, for example, businesses from the business database which offer the thing being sought by the consumer and are most optimally matched to the consumer's personality trait profile. See FIG. 1 which shows a flow diagram representation of a preferred embodiment of the present invention in the form of a method for consumer and business matching.

It should be noted that the tagging aspect (16) of the present invention is unique in that these personality traits are not disclosed to the user. The benefit of this is that the consumer is not "labeled" and cannot in any way bias this identification of his/her personality traits so as to seek to be matched with a type of experience or product.

It can also be noted that this is the reverse of what we'll refer to as the "typical tagging operation," because typically the user supplies the tags (i.e., the consumer characterizes him/herself as "thoughtful," "caring," etc.)—but here, the user or consumer is not supplying any tags. Note should also be made of the relative simplicity of the present invention's tagging method as compared to the greater complexity involved with typical questionnaire format for collecting consumer and business inputs.

The data resulting from the consumer's responses to the tagged images eventually make up a significant portion of a consumer's profile (22) and is stored in a database. When a consumer's personality traits profile is sufficiently identified, the consumer begins the present invention's matching process by executing a "find" or match function, and at that time the consumer's profile is processed in an algorithm (28) that divides the total identified consumer traits by the total of all traits, and then does base pair matching against a database of available experiences (i.e., services, events, experiential activities) to which such traits are also correlated or ascribed so as to provide the consumer with a list of ranked businesses which offer the experience or item being sought by the consumer and matched to the consumer's personality.

To implement the present invention, there are certain key background steps or tasks that must be accomplished, these include:

(a) identifying and establishing, as a result of one knowledge's of the psychology literature, a set of personality traits

(12) that are predictive of how a consumer who possesses a subset of these personality traits is most likely to make a purchase or selection decision as it relates to choosing between an array of available experiences; a preferred embodiment of traits for the present invention is a set of sixty pairs of key traits, where each positive trait has a corresponding negative trait (e.g., passion vs. apathy), thus, there are ninety four total traits. Other empirically tested personality indexes, such as The "Meyers-Briggs Type Indicator," also measure dichotomous traits resulting in sixteen possible outcomes/variables. The sixty pairs of dichotomous traits in the present invention can result in an infinitely unique profile rather than the fixed categorical system known to the Meyers-Briggs. See FIG. 2 for a representative list of such personality traits.

Figure 3:
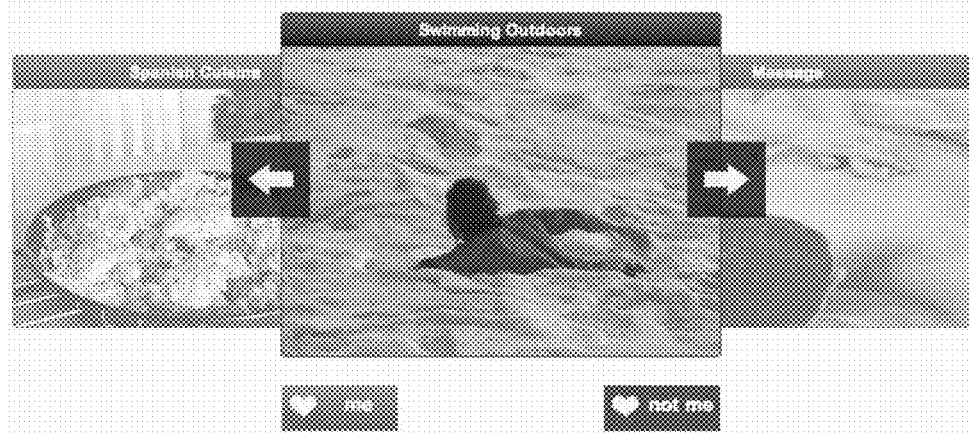
FIGS. 3(a)-3(c) provide representative images, shown in groups of three, that could be used by the present invention.
Figure 3:
Figure 3:
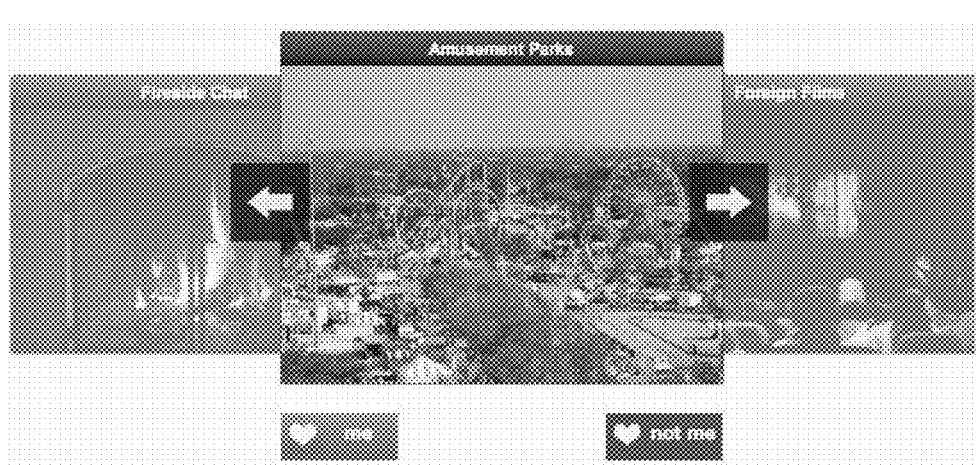

(b) compiling a collection of images (14) that are representative of an array of experiences, see FIGS. 3(a)-3(c) for a representative collection of such images and in which the images are being displayed in groups of three; notes also that the use of the term images should be given its broadest definition so as to include not just static, visual images, but also videos that may or may not have sound and even recording images of music and other types of sound.

Figure 4:
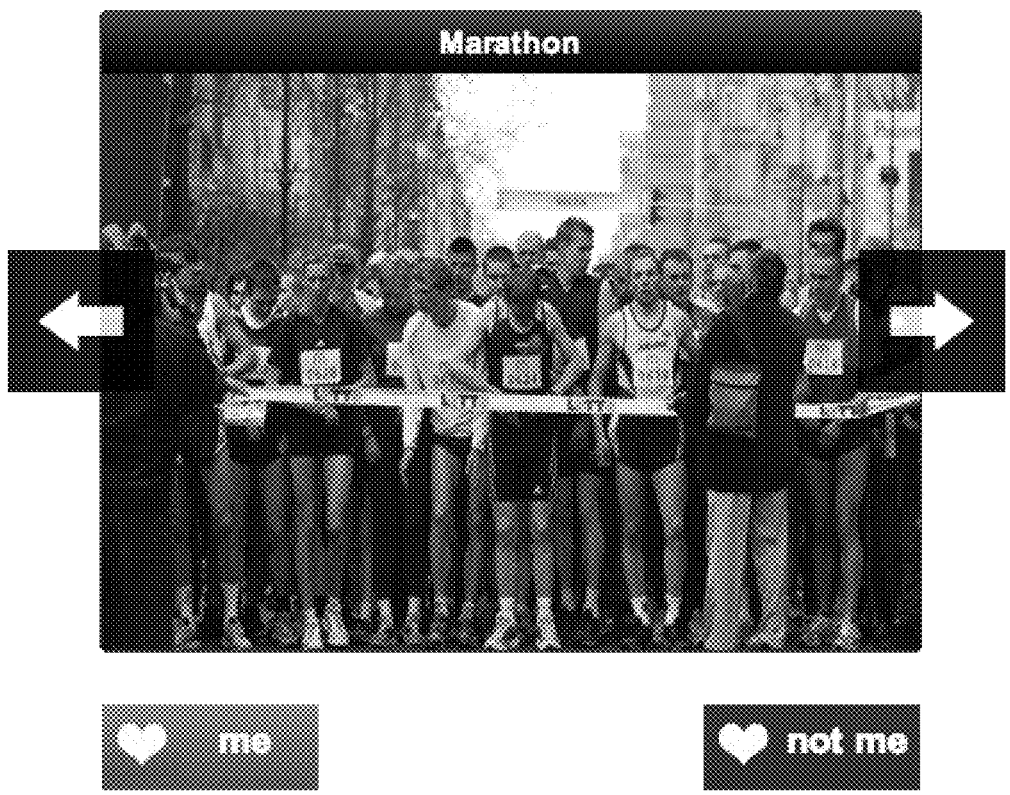
FIG. 4 provides an example of an image to which has been applied the scoring or personality trait assignment process of the present invention.

(c) scoring (16) each of these images (14) by assigning to each up to five ranked identified personality traits (12) based, from a psychological viewpoint, on whether a consumer viewing the image would or would not be likely identify with or to elect to participate-in the experience or activity represented in the image; from trial and experimentation it was found that the optimal number of traits to be tagged to most images is five for computational efficiency (speed) and intelligence of the result (i.e. fewer traits that are tagged to an image resulted in less accurate results, and more traits that are tagged to an image did not result in materially better results), see FIG. 4 for an example of an image to which has been applied this scoring or assignment process.

(d) providing a means (18) for said individual to view or causing a consumer to view these images and identify with which of these images the consumer elects to be associated, and then establishing, based upon the consumer's identified associations (or alternatively, using a specified first algorithm (20) for relating selection associations with defined personality trait profiles and the personality trait scoring of the images, a personality trait profile (22) for the consumer; where the consumer could uses an image viewer, e.g., a website that provides this matching services and wherein the consumer uses his/her computer to access the internet and the website and to then view the images on the consumer's own monitor or display screen.

Figure 5A:
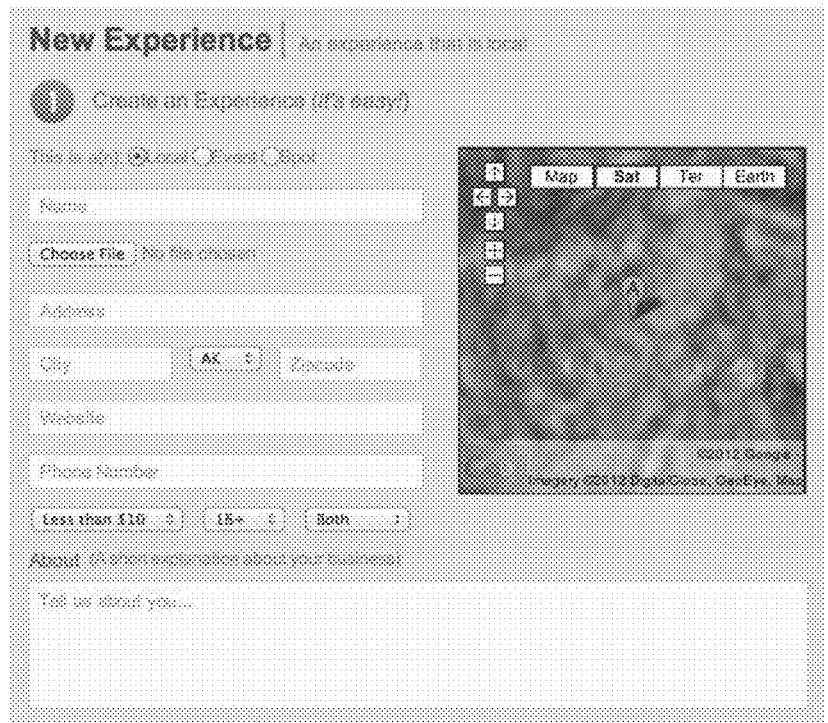
FIGS. 5(a)-5(b) provide examples of the communications to businesses that are used to ascribe personality traits to the services or products offered by these businesses.
Figure 5A:
Figure 5B:
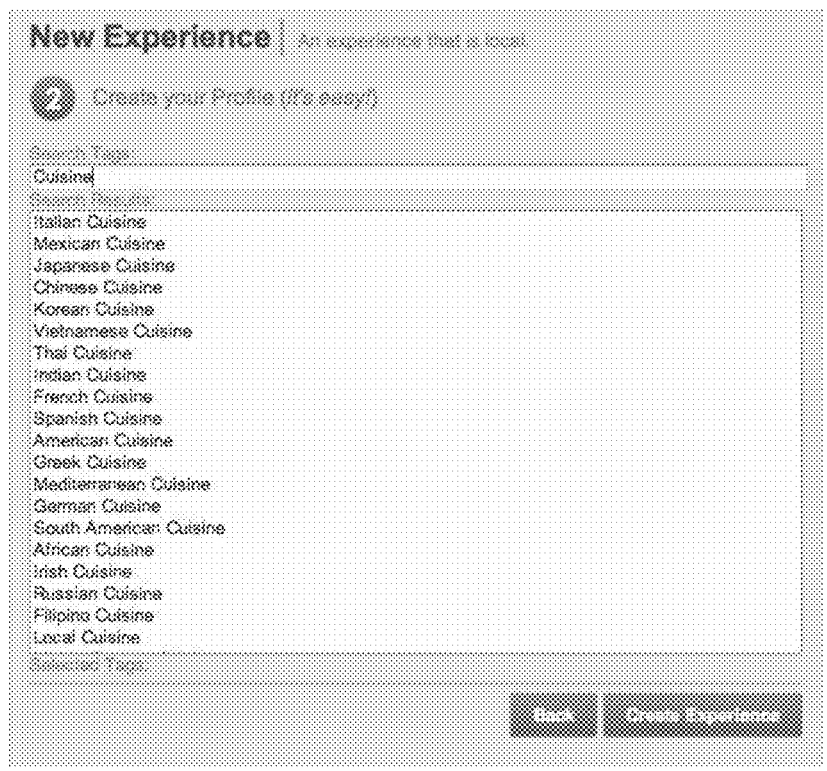
Figure 6:
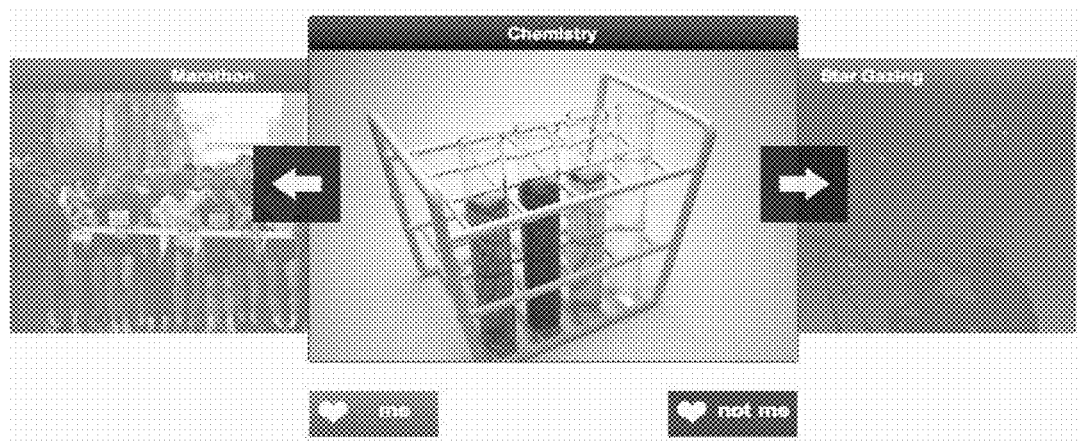
FIG. 6 is an example of a first image generated by the tag slider the image carousel displaying the image to be evaluated) of the present invention and is used by the consumer to choose "me"/"not me" based on their intuitive response and preferences toward the image currently being displayed.
Figure 7:
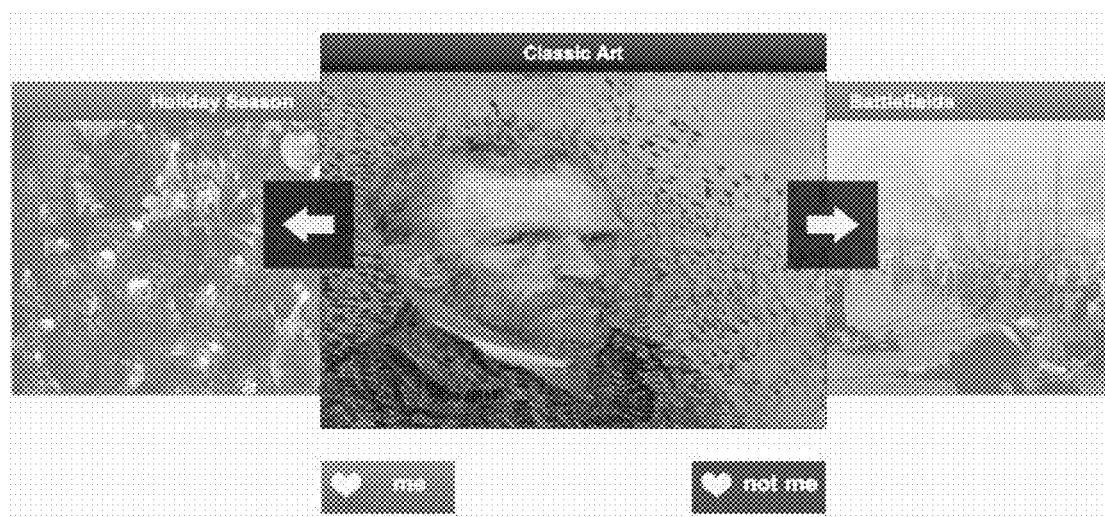
FIG. 7 is an example of a second image generated by the tag slider of the present invention.
Figure 8:
FIG. 8 is an example of a third image generated by the tag slider of the present invention.
Figure 9:
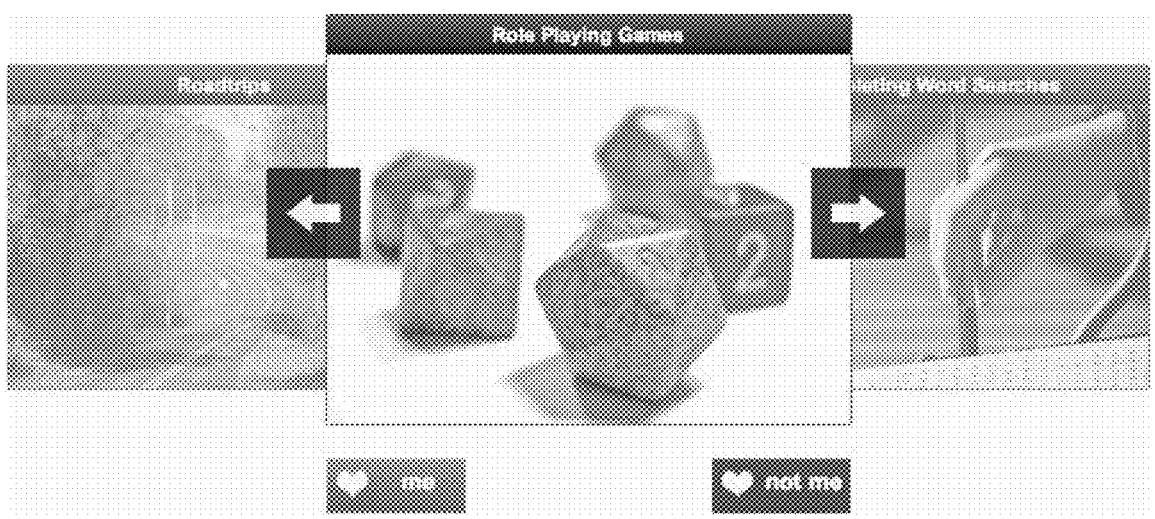
FIG. 9 is an example of a fourth image generated by the tag slider of the present invention.
Figure 10:
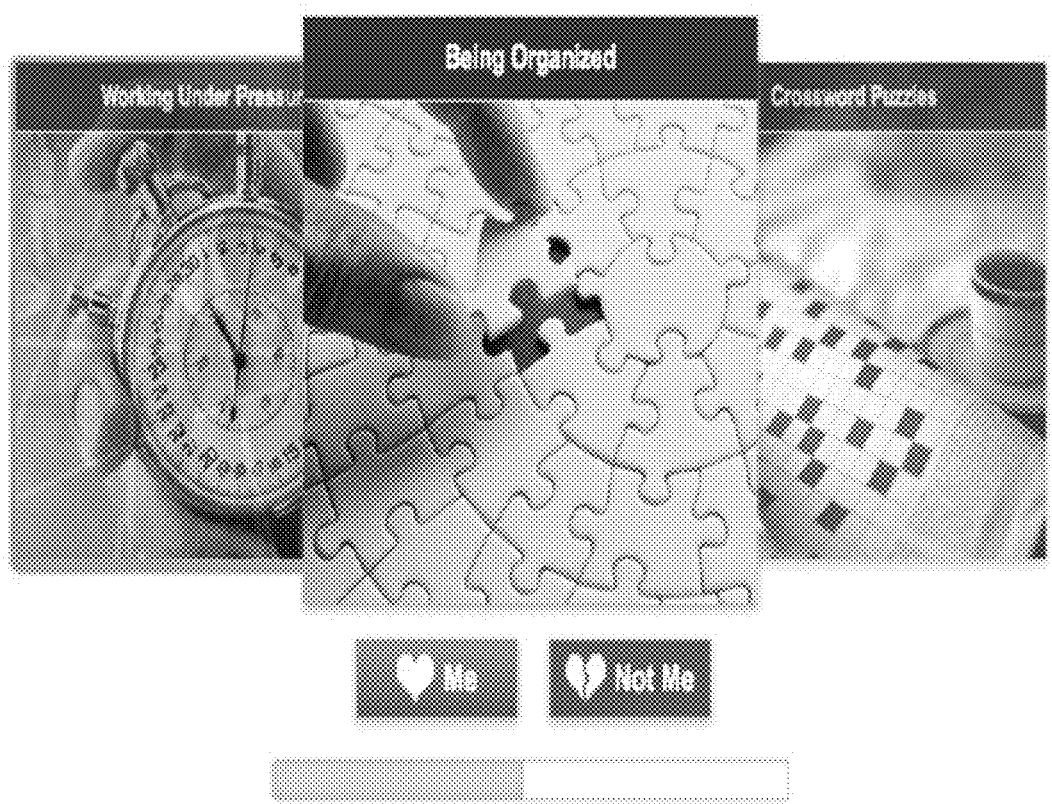
FIGS. 10-13 illustrate some of the career module's images and the descriptive titles and personality traits that have been tagged to these images.
Figure 11:
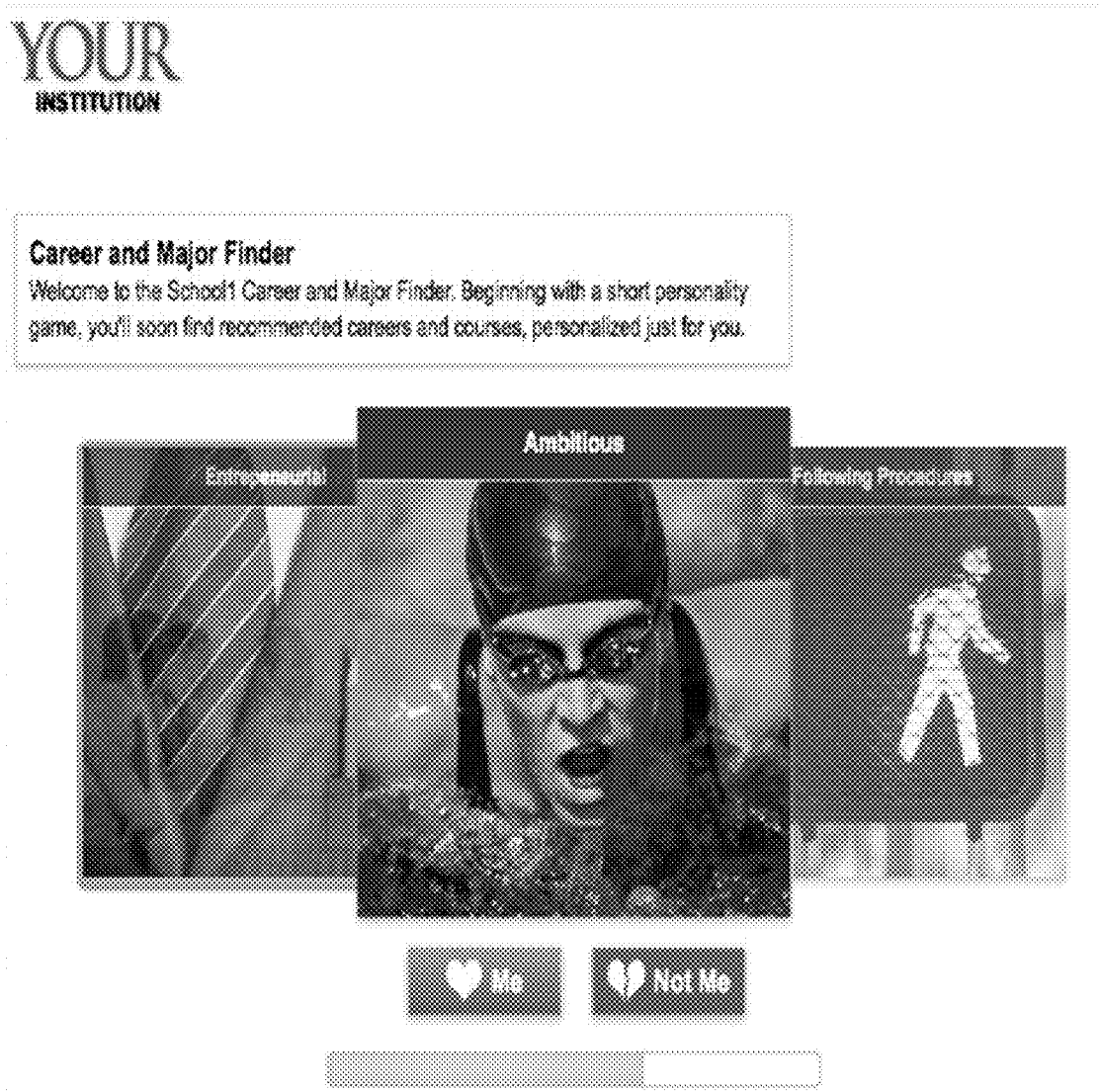
Figure 12:
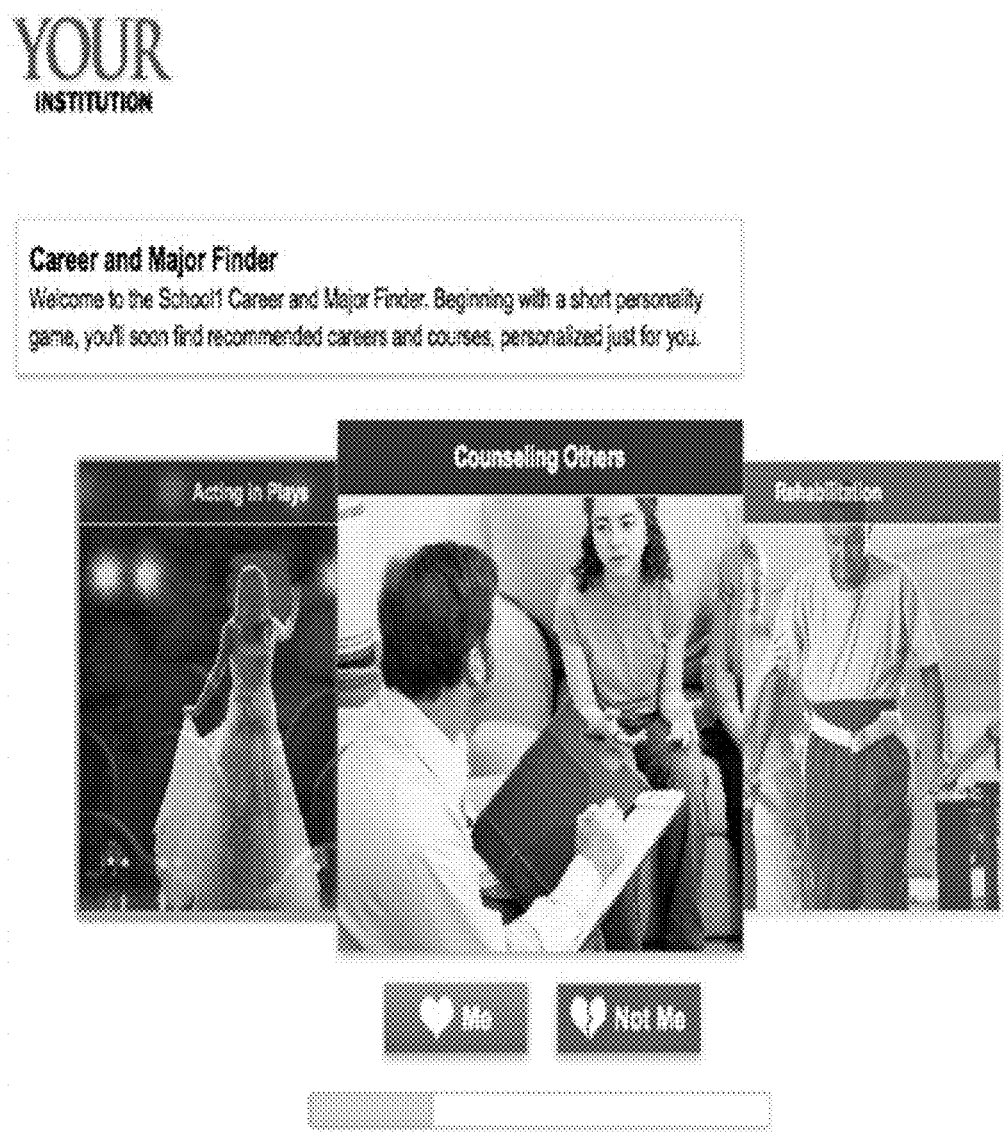
Figure 13:
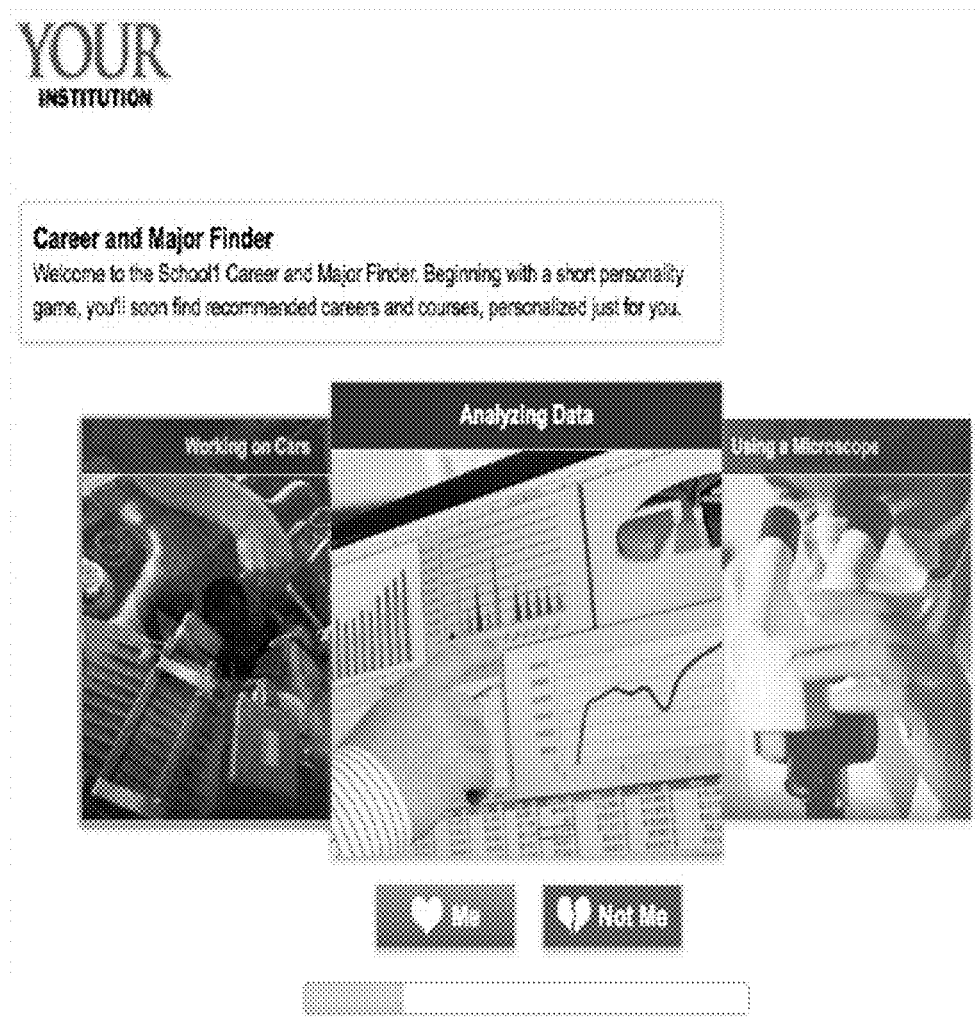

(e) directing to businesses (i.e., providers of products, services, experiences, etc.) communications which require responses that are used to ascribe a personality trait profile (26) to each of these businesses and/or the things they are providing, wherein these business/thing personality trait profiles (26) reflect the businesses or their available things and to which are ascribable the tags/personality traits which the consumers who select them are most likely to possess (or alternatively, using a specified second algorithm for relating a businesses' available things to their selectability by consumers sharing defined personality trait profiles), the result of this activity being the creation of a business/thing profile database; see FIGS. 5(a)-5(b) for examples of the communications to businesses that are used to ascribe personality traits to the services or products offered by the businesses, and (f) formulating a matching or third algorithm (28) with which to search this business/thing profile database so as to efficiently identify within it those businesses or things which have the highest likelihood of being selected for purchase by a consumer having a specified set of personality traits or a specific personality trait profile. A preferred embodiment of this required algorithm is given below:

$$\Delta = \sum \left( \left( \left( \frac{\mu}{\sum \mu} \right) * 100 \right) - \left( \left( \frac{\alpha}{\sum \alpha} \right) * 100 \right) \right)$$

$$\text{Match Percentage} = \left( \frac{\Delta}{\sum \Delta} \right) * 100$$

Where:
$\mu$=Consumer trait rating
$\alpha$=item ascribed trait rating

It should be noted that many other matching algorithms exist in the technical literature which are suitable for use with the present invention; therefore no further discussion will be presented herein of such matching algorithms. All such algorithms should be considered to come within the scope of the present invention.

After these background tasks are accomplished, one may proceed to the next stage in the implementation of the present invention which is the establishment of the guidelines for the collection of the required consumer information.

This involves guidance of the step in which a consumer views images from an image collection and responds as to whether the activity/experience, etc. represented in each image being viewed is something that the consumer would or would not elect to participate-in. As shown in FIGS. 6-9, this step can be accomplished by causing images to slide across a screen and have the consumer click one of two clickable buttons ("Me" or "Not Me" with respect to whether the consumer viewing the image would or would not be likely to elect to participate in the experience represented in the image).

It should also be noted that this consumer information collection task can include more that personality traits, e.g., in a preferred embodiment of the present invention there are approximately 100 "non-traitable" preferences that can be related to that which is being sought by a consumer.

Collecting and storing these responses and their implications for the assigned personality traits compiled for this consumer are a vital and novel portion of the consumer's profile.

It should also be noted that this "me/not me" selection task allows one to develop an understanding of what people do not prefer. "Me" and "Not Me" are equally as "acceptable." As much useful data and insight is provided from the "not me" responses as is provided by the "me" responses and can be used to aid in identifying many heretofore un-attempted matching tasks (e.g., matching supposedly attracted Opposites; matching areas outside one's comfort zone; helping one try something different; helping one explore the unenlightened you)

The final step in the present invention is to utilize its matching algorithm (28) with the compiled consumer profile (22) to search the business/thing profile (26) database so as to provide the consumer with a list of those businesses whose available things have the highest likelihood of being selected or purchased from among the array of things available in the business database. This step can also involve allowing the consumer to filter the matches that will be reported to him according to various selection criteria (e.g., service range of item provider, price, availability, weather conditions).

It should again be noted that the present invention is not limited to just consumer to business matching. It can also be used in many other areas.

For example, the present invention can take the form of a comprehensive, quasi personality trait-based assessment tool that measures vocational proclivities and interests in a novel, fun and meaningful way for college students.

As with well-known, standard paper-and-pencil, vocational-interest-assessment tests, the present invention's "career module" assesses one in order to make recommendations for work activities. However, the present invention, as previously mentioned, interfaces with a user in a totally novel way and uses novel, psychological assessments to ascertain not only who a person is but also what a person likes to do in order to make career recommendations.

The career module version of the present invention is designed as an on-line instrument to assess personality traits and preferences as they relate to the user's personal and optimal approach to current or future work life choices. This career module uses vibrant images (i.e., images include not just static, visual images, but also videos that may or may not have sound and even recording images of music and other types of sound) to capture the attention of the user and produce a feeling and an association, leading the student to respond "Me" or "Not Me" to each image.

The career module user experience begins with a promise that this test will measure the essence of career personality in a comparatively short amount of time-five minutes or less. Users are introduced to a "slider" (i.e., a user interface by which a series of vibrant images are displayed such that: (i) the image for consideration is larger than the previous and next image, (ii) the previous and next images have a lower resolution, (iii) an input device, such as a mouse or a finger on a touch screen, is used to go forward or back in the series) that shows an image and a descriptor or title (i.e., a picture of a tent and the words "going camping").

These vibrant images are thought to evoke both a rational and an intuitive feeling or sensory response in the user and ultimately an association with the user that he/she is asked to characterize as being either "Me" and "Not Me." Alternatively, the slider and its series of vibrant images is seen to be a means for evoking both a rational and a sensory response and a subsequent association with a user such that one who would elect to be associated with certain images can from a psychological perspective be assessed to possess a specific psychological trait.

The choice of "Me" and "Not Me" is designed to be neutral, with neither answer having a more positive slant than the other. The user-friendliness and the short assessment-taking time are thought to reduce the resistance commonly encountered with traditional inventories.

As the user completes his/her associations with the slides or images in the assessment, the career module measures the user's various personality traits and then relates these to what the career module defines as seven career personality categories or profiles into which it is postulated that most vocational interests can be classified. These categories are denoted as: Naturalist, Action-Taker, Analyst, Visionary, Inventor, Mentor and Planner. See (FIG. 9(a) for a description of each of these categories.

In defining these seven career personality categories, the present inventors are furthering what are generally referred to as the Holland Occupational Themes or six personality categorization of most vocations (i.e., Holland postulated that certain personalities seek out and flourish in the career environments which fit them and that jobs and career environments are therefore classifiable by the personalities that flourish in them—furthermore, six categories of career personalities could be defined and used to categorize most vocations along the lines of whether one who had one of these six personality categories was likely be to satisfied in a specific vocation or career environment alternately said, knowing one's career personality is predictive of whether one will flourish in a particular vocation or career environment), as well as the Introverted/Extroverted element of the Myers-Briggs Type Indicator. The theory and structure of the career module of the present invention expands upon the current standard body of vocational knowledge in personality-trait and individual interest career-matching.

Thus, one's functional relationship to the herein defined seven career personality categories is referred to herein as one's career personality profile. Alternatively, we speak of the present invention's first algorithm establishing, based upon the individual's identified image associations and the personality traits assigned or affixed to these images, a career personality profile for the individual.

In addition to established and aforementioned vocational and personality knowledge and theory, this algorithm may also utilize "attachment theory" and "ego psychological theory" to understand healthy defenses and personality, consider conscious and unconscious motivations, attachments and ego structure, and thereby establish an individual's career personality profile.

For instance, in developing the "Naturalist" category, it was taken into account that this is a person who prefers to work outdoors and has a distinct attachment to elements of the natural world. Persons falling into this category have a strong allegiance to the protection and conservation of the environment. Working toward this mission supersedes working with people for this group. This knowledge informed the selection of traits that would define the Naturalist (i.e., earthy, protective, etc.).

Another example lies in the "Planner" category where detail-orientation and organization is measured and understood not just as a style or approach to work, but also with the concept that orderliness serves as a healthy defense against the anxiety associated with lack of structure. In contrast, "Inventor" tags measure artistic inclination including the need for lack of structure as a personal orientation to work and productivity. The underlying theory around each category grouping identifies which exclusive traits are attributed to each category. The composite of attributable or assigned traits and preferences results in each user's personality blend outcome leading to their specific and personalized career results.

In a preferred embodiment, eighty-four slides or images are used to measure various personality traits that have been associated with the module's identified seven career personality categories; twelve slides per category. See FIGS. 10-13 for examples of some of the module's images and their associated personality traits and preferences. An illustrative means for relating some of the key personality traits which are most helpful in helping to distinguish between the module's seven career personality categories is illustrated FIG. 14.

The type of career advice that the present invention might identify for one seeking career counseling include, for example: (a) what work environments a person is best suited to, (b) what work he or she will most enjoy doing, and (c) in which work situations he or she will truly excel wherein we refer to each and every example of such career advice as identifying optimal "career paths."

It should be noted that the descriptions of such "career paths" can often be expressed in the same or similar terminology that is used to describe the seven career personality categories of the present invention. This situation provides the basis or rationale for categorizing such "career paths" into one of the career personality categories or profiles defined herein. Alternatively, and in the terminology previously introduced in this section, we can speak of a second algorithm that is configured to use the generalized descriptions of such "career paths" to categorize them into our seven defined, career personality profiles or categories.

Since there exist many examples of such categorizations in the technical literature, especially in relation to the previously mentioned Holland Occupational Themes or six personality categorization of most vocations, we will not further describe this process herein. A small sample of such a vocational categorization according to career personality categories is shown in FIG. 15.

A third or matching algorithm is used to identify, from one's career personality category or profile, the career counseling advice (expressed in terms of recommended "career paths") that is given to one seeking such advice. For example, this matching or "career path identification" can be achieved by selecting or identifying optimal matches based on the similarity of the user's career personality profiles with the career personality profiles that were coded or ascribed to the career paths.

Each user, upon completion of the assessment, can receive his or her results in many different ways. For example, in a preferred embodiment of the present invention, these results are presented on a screen shot, displayed on a video monitor connected to a computer on which the application program or software for the career module is running, which clearly outlines his or her strongest areas and demonstrate the full picture of how each of the present invention's seven career categories plays into that individual's work personality. At that point, the user is also able to read the description of each category (e.g., using other screen shots provided by the career module).

This preferred embodiment of the career module of the present invention then goes on to encourage an assessed individual to read and learn (using other module provided screen shots) about his or her personality blend, which provides a detailed description of the individual's two most dominant personality categories. See FIGS. 1-17.

This allows for a further sense of personalization and nuance, as it is the whole picture, not just the most dominant category, which might lead a user to choose a particular career or major. On the same screen shot or webpage, users may see recommended "fields" consistent with their personality blend.

After reading about his or her unique career personality, the user is, via still more module provided screen shots, led to career suggestions based on these results. Users can scroll through career ideas and click to learn more about the choices they find intriguing. The module also provides the ability for a user to flag favorites for further future exploration and to share these results to various social media platforms.

The career module of the present invention takes what was once a tedious, time consuming, conventional test and makes it digital, fun, and fast. Users feel at-ease using technology with which they are familiar and pictures that are fun—allowing for a truly accurate measure of the essence behind a student's work strength and preferences.

The results yielded by the career module of the present invention have been statistically tested for their reliability and validity. Forty-six entering graduate students in a single discipline were assessed using the present invention's career module. A similar assessment was re-administered to each of the 46 students again is two weeks later to test its internal consistency. It was found that these assessments were highly reliable and consistent in that over half of the students achieved identical results between their earlier and later assessments time-points. Median test-retest correlations were 0.89, 0.85, respectively. See FIGS. 18-19. The validity of the results yielded by this career module are comparable to or exceed those achieved by the well-known, standard paper-and-pencil, vocational interest assessment tests.

As a second example of how the present invention can be used in an academic counseling environment, consider the use of the present invention to assist in assessing a student's "learning" style.

Today's classrooms are very different from the ones of years past. Not only has modern technology enhanced the learning experience for may students, but also studies into students' different learning styles have strengthened the educational experience. According to the Center for Teaching at Vanderbilt University, learning styles "describe how learners gather, sift through, interpret, organize, come to conclusions about, and "store" information for further use". For example, some students learn best through visual means while others understand information more clearly through an auditory medium.

Even though more teachers are discovering information about different learning styles, some educators are hesitant to write multiple lesson plans. It has been noted that instructors often believe the way they learn is the right or easiest way for their students to learn. Often they base their choice of methods of instruction upon that belief. If teachers were to compare their teaching styles to their students' learning styles, however, then they may be able to better evaluate more effective ways to educating their classes.

There are several tests to determine learning styles already out on the market. One of the most well known is the "Memletics Learning Styles Test." This sorts learners into seven categories, ranging from how students take in information to the environment in which the students learn the best. It is also instructive to note that there are at this time no known methods or assessment tools which seek to determine or distinguish between educators' possibly different teaching styles.

With the introduction in some academic settings of "Individualized Education Plans (IEPs)," teachers have begun modifying their lessons to meet the learning needs of students. Becoming more cognizant of different learning styles makes the alteration of lessons simpler, but teachers need to know what the students' learning styles are before they can begin creating their lessons.

The present invention can be adapted into a "learning style" version or module that can quickly and painlessly, for the student, perform this assessment task. This module builds upon the established educational knowledge that individuals have unique ways to integrate, learn and retain information.

Like other alternative versions of the present invention, this module assesses a student's personality traits, preferences and learning styles with a unique user interface and in a game-like fashion which diminishes the test-effect often found with other assessment methods. Results are immediately available to the learner and to any associated teacher so as to thereby allow teaching/learning modifications to be quickly and precisely implemented.

This module defines eight learning styles or categories: Visual, Auditory, Physical/Hands On, Interactive, Reflective, Rational, Verbal and Environmental. See FIG. 20.

A student uses this module's slider to elect as to whether or not to associate with the activities, products, etc. contained in slider's displayed images. As with most adaptations of the present invention to perform a specific task, a key part of this adaptation process is the specialized configuration of the module's images. This configuration is done so that the module's images are especially helpful in assessing whether the individual possesses the specific personality traits that are most determinative in distinguishing between the herein-defined, various learning styles that are descriptive of how learners best perform the learning tasks of gather, sift through, interpret, organize, come to conclusions about and store information.

In a preferred embodiment, this module's slider consists of eighty images—ten from each learning style or category. Users respond to each image by choosing "Me" or "Not Me" based on their personal resonance to an image's message or concept.

At the end of the carousel of images, the user is shown their results. This will usually include a pie chart with the percentage breakdown of their results along with the written definition of their primary learning style as well as their "blend," which is the composite of their top two results. See FIGS. 21-22 which shows examples of the blends of learning styles that can be assessed with the learning style module.

Where the student uses an image viewer that consists of a website that provides this matching services and wherein the student uses his/her computer to access the internet and the website and to then view the slider and its images on the student's own monitor or display screen, a page on this website page usually will also display visual "stamps" which depict the student's learning style along with learning resources that are relevant to the student's result. For example, if the student is found to be a "visual" learner, the resource would suggest color-coding the student's notes and/or using flash cards as a study tool.

Each image and tag of this module is especially selected to correlate with its relevance to a particular learning category. For example, an image entitled "Oral Reports" would be assigned to the Auditory category. Each image tag is imbued with preference data (i.e. prefers listening) as well as five personality traits that are strongly identified with the tag as well as with the broader learning style category.

It can be noted that an additional strength of this module is that it inherently uses all of the learning approaches that are simultaneously being measured. For example, user's are presented with Visual images, with Verbal titles that are meant to appeal to the Auditory learner; it utilizes a hands-on approach for the Physical learner, requires the user to Reflect; it is Interactive, and persuades the user to be Rational as they sometimes play with concepts related to their Environment. This multi-oriented approach allows for receptivity by each learning style while measuring learning style.

With our knowledge and understanding of students' different learning styles has also come the realization that teachers also exhibit preferred "teaching" styles—e.g., some teachers tend to teach by promoting classroom discussions in which students are encouraged to verbally express their understanding of a subject (a Verbal teacher), while others always use a drawing board on which to place notes or illustrations which help to explain a subject or lesson which the teacher is trying to communicate (a Visual teacher).

This realization has led us to postulate that the same titles previously introduced for our recognized eight different "learning" styles can also be used to describe teachers' different teaching styles. Thus, we have herein defined in FIG. 23 what we refer to as: Visual, Auditory, Physical/Hands On, Interactive, Reflective, Rational, Verbal and Environmental "teaching styles.

What is needed now is a way or means to evaluate teachers' instructional methods so that they can be classified into one of these eight "teaching" styles. Once an instructor or teacher knows his or her "teaching" style and recognizes the impact that it may be having on the learning ability or study rate of their students—especially those whose "learning" style differs greatly from their own natural "teaching" style, the hope would be that a teacher would be willing to amend his/her teaching methods so as to better correlate them with a student's learning style as a means to try to increase the speed at which the student can learn and master new subject matter.

An adaptation of the present invention to this task serves as a third example of how the present invention can be used in an academic setting. This adaptation involves identifying a set of personality traits and preferences that can be used to help distinguish between our defined "teaching" styles. This is followed by assembling a collection of images to which some of these traits are ascribable—alternatively said, the images are further configured to assess whether an assessed teacher possesses the specific personality traits that are helpful in distinguishing between one of our eight defined teaching styles.

A slider or carousel of these images is then shown to the teacher who is asked to elect to be associated with the message of the image by choosing "Me" or "Not Me" in response to viewing each image in the carousel. Analyzing these associations identifies the teacher's preferred traits and preferences which leads to a distinguishing or identification of the assessed teacher's "teaching" style.

The foregoing is considered as illustrative only of the principles of the present invention. Further, since numerous modifications and changes will readily occur to is those skilled in the art, it is not desired to limit the invention to the exact construction and operation shown and described herein. Accordingly, all suitable modifications and equivalents may be resorted to, falling within the scope of the invention that are set forth in the claims to the invention.

We claim:

1. A user interface for use on the display of a computer device for use in the matching services industry to enable those in the industry using said user interface to match an individual seeking something and one of a plurality of suppliers who each can provide to differing degrees said something, said user interface comprising:
  a plurality of images having an assigned plurality of personality traits that are assigned based on the psychological content of the respective image,
  a first portion of said user interface that is adapted to display an image from said plurality of images for viewing on said display by an individual,
  a second portion of said user interface that is adapted for use by said individual to identify whether said individual chooses to be associated with said image that is displayed in said first portion,
  wherein said assigned plurality of personality traits are adapted such that a plurality of said personality traits are ranked and assigned to each of said plurality of images based on the psychological content of the respective image, whereby said individual who chooses to be associated with a particular one of said plurality of images can from a psychological perspective be assessed to possess said assigned plurality of said personality traits which are predictive of how said individual is likely to make a selection decision when selecting from among said plurality of suppliers that can each provide to a differing degree said something being sought by said individual, an algorithm having a configuration adapted to, utilizing said images with which said individual chooses to be associated and the related plurality of said personality traits that are ranked and assigned to each of said images, match said individual with one of said plurality of suppliers, wherein said user interface is further adapted so that said assigned plurality of personality traits are not shown on said display to said individual, wherein said plurality of images are adapted to be viewed in an array of images, wherein said first portion of said user interface including a first indicia that is adapted to be used by said individual to go forward in said array of images and a second indicia that is adapted to be used by said individual to go backward in said array of images, and wherein said second portion of said user interface including a third indicia that is adapted to be used by said individual to indicate that said individual chooses to be associated with said photographic image that is displayed in said first portion, and a fourth indicia that is adapted to be used by said individual to indicate that said individual chooses to not be associated with said image that is displayed in said first portion.

2. The user interface as recited in claim 1, wherein:
said first portion having central, next and preceding segments that allows said individual to view said array of images so that at any instant a central image is displayed in said central segment in a distinguishable manner from the image which preceded said central image and is now being shown in said preceded segment and the image which will be the next to be viewed in said array of images and is now being displayed in said next segment.

3. The user interface as recited in claim 1, wherein:
said distinguishable manner is achieved by making said central image larger than the preceding image and the next image which will be presented in said array of images.

4. The user interface as recited in claim 2, wherein:
said distinguishable manner is achieved by making said central image larger than the preceding image and the next image which will be presented in said array of images.

5. The user interface as recited in claim 3, wherein:
said distinguishable manner is achieved by making said central image have a greater resolution than the preceding image and the next image which will be presented in said array of images.

6. The user interface as recited in claim 1, wherein:
each of said plurality of images has text that is adapted to clarify for said individual the nature of said image under consideration and for which said individual is to choose to make an association.

7. The user interface as recited in claim 1, wherein: each of said plurality of images has text that is adapted to clarify for said individual the nature of said image under consideration and for which said individual is to choose to make an association.

8. The user interface as recited in claim 5, wherein:
each of said plurality of images has text that is adapted to clarify for said individual the nature of said image under consideration and for which said individual is to choose to make an association.

9. The user interface as recited in claim 8, wherein:
said text is a descriptive title of said image.

10. The user interface as recited in claim 1, wherein:
said something being sought by said individual is career counseling guidance and said suppliers are differing career environments.

11. The user interface as recited in claim 2, wherein:
said something being sought by said individual is career counseling guidance and said suppliers are differing career environments.

12. The user interface as recited in claim 5, wherein:
said something being sought by said individual is career counseling guidance and said suppliers are differing career environments.

13. The user interface as recited in claim 8, wherein:
said something being sought by said individual is career counseling guidance and said suppliers are differing career environments.

14. The user interface as recited in claim 9, wherein:
said something being sought by said individual is career counseling guidance and said suppliers are differing career environments.

15. The user interface as recited in claim 1, wherein:
said something being sought by said individual is an assessment of the learning style of said individual and said suppliers are a plurality of defined learning styles that are descriptive of how learners best perform a learning task.

16. The user interface as recited in claim 2, wherein:
said something being sought by said individual is an assessment of the learning style of said individual and said suppliers are a plurality of defined learning styles that are descriptive of how learners best perform a learning task.

17. The user interface as recited in claim 5, wherein:
said something being sought by said individual is an assessment of the learning style of said individual and said suppliers are a plurality of defined learning styles that are descriptive of how learners best perform a learning task.

18. The user interface as recited in claim 8, wherein:
said something being sought by said individual is an assessment of the learning style of said individual and said suppliers are a plurality of defined learning styles that are descriptive of how learners best perform a learning task.

19. The user interface as recited in claim 9, wherein:
said something being sought by said individual is an assessment of the learning style of said individual and said suppliers are a plurality of defined learning styles that are descriptive of how learners best perform a learning task.

20. The user interface as recited in claim 1, wherein:
said something being sought by said individual is an assessment of the teaching style that is the most effective for helping said individual to learn and said suppliers are a plurality of defined teaching styles that are descriptive of how teachers go about communicating information and knowledge to their students.

21. The user interface as recited in claim 2, wherein:
said something being sought by said individual is an assessment of the teaching style that is the most effective for helping said individual to learn and said suppliers are a plurality of defined teaching styles that are descriptive of how teachers go about communicating information and knowledge to their students.

22. The user interface as recited in claim 5, wherein:
said something being sought by said individual is an assessment of the teaching style that is the most effective for helping said individual to learn and said suppliers are a plurality of defined teaching styles that are descriptive of how teachers go about communicating information and knowledge to their students.

23. The user interface as recited in claim 8, wherein:
said something being sought by said individual is an assessment of the teaching style that is the most effective for helping said individual to learn and said suppliers are a plurality of defined teaching styles that are descriptive of how teachers go about communicating information and knowledge to their students.

24. The user interface as recited in claim 9, wherein:
said something being sought by said individual is an assessment of the teaching style that is the most effective for helping said individual to learn and said suppliers are a plurality of defined teaching styles that are descriptive of how teachers go about communicating information and knowledge to their students.

25. A method that utilizes a user interface on the display of a computer device for use in the matching services industry by enabling those in the industry to match an individual seeking something and one of a plurality of suppliers who each can provide to differing degrees said something, said method comprising the steps of:
providing a plurality of images having an assigned plurality of personality traits that are assigned based on the psychological content of the respective image,
providing said user interface with a first portion that is adapted to display an image from said plurality of images on said display for viewing by an individual,
providing said user interface with a second portion that is adapted for use by said individual to identify whether said individual chooses to be associated with said image that is displayed in said first portion,
wherein said assigned plurality of personality traits are adapted such that a plurality of said personality traits are ranked and assigned to each of said plurality of images based on the psychological content of the respective image,
whereby said individual who chooses to be associated with a particular one of said plurality of images can from a psychological perspective be assessed to possess said assigned plurality of said personality traits which are predictive of how said individual is likely to make a selection decision when selecting from among said plurality of suppliers that can each provide to a differing degree said something being sought by said individual,
providing an algorithm having a configuration adapted to, utilizing said images with which said individual chooses to be associated and the related plurality of said personality traits that are ranked and assigned to each of said images, match said individual with one of said plurality of suppliers,
wherein said user interface is further adapted so that said assigned plurality of personality traits are not shown on said display to said individual,
wherein said plurality of images are adapted to be viewed in an array of images,
wherein said first portion of said user interface including a first indicia that is adapted to be used by said individual to go forward in said array of images and a second indicia that is adapted to be used by said individual to go backward in said array of images, and
wherein said second portion of said user interface including a third indicia that is adapted to be used by said individual to indicate that said individual chooses to be associated with said photographic image that is displayed in said first portion, and a fourth indicia that is adapted to be used by said individual to indicate that said individual chooses to not be associated with said image that is displayed in said first portion.

26. The method as recited in claim 25, wherein:
said first portion having central, next and preceding segments that allows said individual to view said array of images so that at any instant a central image is displayed in said central segment in a distinguishable manner from the image which preceded said central image and is now shown in said preceded segment and the image which will be the next to be viewed in said array of images and is now being displayed in said next segment.

27. The method as recited in claim 25, wherein:
each of said plurality of images has text that is adapted to clarify for said individual the nature of said image under consideration and for which said individual is to choose to make an association.

28. The method as recited in claim 27, wherein:
said text is a descriptive title of said image.

29. The method as recited in claim 25, wherein:
said something being sought by said individual is career counseling guidance and said suppliers are differing career environments.

30. The method as recited in claim 26, wherein:
said something being sought by said individual is career counseling guidance and said suppliers are differing career environments.

31. The method as recited in claim 25, wherein:
said something being sought by said individual is an assessment of the learning style of said individual and said suppliers are a plurality of defined learning styles that are descriptive of how learners best perform a learning task.

32. The method as recited in claim 26, wherein:
said something being sought by said individual is an assessment of the learning style of said individual and said suppliers are a plurality of defined learning styles that are descriptive of how learners best perform a learning task.

33. The method as recited in claim 25, wherein:
said something being sought by said individual is an assessment of the teaching style that is the most effective for helping said individual to learn and said suppliers are a plurality of defined teaching styles that are descriptive of how teachers go about communicating information and knowledge to their students.

34. The method as recited in claim 26, wherein:
said something being sought by said individual is an assessment of the teaching style that is the most effective for helping said individual to learn and said suppliers are a plurality of defined teaching styles that are descriptive of how teachers go about communicating information and knowledge to their students.

* * * * *